(12) United States Patent
Horita

(10) Patent No.: US 7,274,827 B2
(45) Date of Patent: Sep. 25, 2007

(54) FILTER PROCESS

(75) Inventor: Satoru Horita, Tochigi (JP)

(73) Assignee: PENTAX Corporation, Tokyo (JP)

( * ) Notice: Subject to any disclaimer, the term of this patent is extended or adjusted under 35 U.S.C. 154(b) by 751 days.

(21) Appl. No.: 10/657,173

(22) Filed: Sep. 9, 2003

(65) Prior Publication Data

US 2004/0051789 A1 Mar. 18, 2004

(30) Foreign Application Priority Data

Sep. 12, 2002 (JP) ............................ P2002-266979
Sep. 12, 2002 (JP) ............................ P2002-266990

(51) Int. Cl.
*G06K 9/40* (2006.01)
(52) U.S. Cl. ...................... 382/264; 382/299; 382/300; 348/222.1; 358/1.1
(58) Field of Classification Search ................ 382/260, 382/299, 300, 162, 264; 348/222.1, 581; 358/1.1, 539, 525
See application file for complete search history.

(56) References Cited

U.S. PATENT DOCUMENTS 5,602,599 A * 2/1997 Greggain .................... 348/581
6,137,914 A * 10/2000 Ligtenberg et al. ......... 382/240
6,738,169 B1 * 5/2004 Nakase ....................... 358/539

FOREIGN PATENT DOCUMENTS

JP    9-251532     9/1997
JP    2000-59679   2/2000

* cited by examiner

*Primary Examiner*—Kanjibhai Patel
(74) *Attorney, Agent, or Firm*—Greenblum & Bernstein, P.L.C.

(57) ABSTRACT

The image resolution of an original image is reduced, so that the original image is changed to a low-resolution image. Here, a bi-linear interpolation or a bi-cubic convolution is carried out for the resolution reduction. Pixel data from each pixel of the low-resolution image is filtered by a low-pass filter. Due to this, the low-resolution image changes to a filtered image. The number of pixels forming the filtered image is restored to the number of pixels forming the original image to generate a restored image. In the restored image, the contours of the objects are sufficiently unclear even if a small matrix is used in the filtration.

14 Claims, 9 Drawing Sheets

FILTER PROCESS

BACKGROUND OF THE INVENTION

1. Field of the Invention

The present invention relates to a digital image filtering device which reduces the image resolution of a digital image composed of original image data when the original image data is filtered.

2. Description of the Related Art

Conventionally, matrix operations are used in the digital image filtering. If the matrix has a comparatively large size (for example a 30×30 matrix), the filter can have a remarkable filtering effect on the image, as shown in Japanese Unexamined Patent Publication (KOKAI) NO.9-251532. However, the larger the size of the matrix, the larger the number of pixels referred to in the matrix, hence the lower the image process speed.

On the other hand, if a small matrix is used, the number of the pixels referred in the matrix is small. Therefore, in this case, the image process speed can become high, but the filter can not produce an adequate filtering effect. For example, if the image data is filtered with a low-pass filter using a small matrix, the image will not become sufficiently unsharp and blurred.

SUMMARY OF THE INVENTION

Therefore, an object of the present invention is to provide a filtering device which has a remarkable filtering effect on the image and which can filter the image data quickly.

According to the present invention, there is provided a filtering device which filters the original image. The filtering device comprises a reducing processor, a filtering processor, and an image restoring processor.

The reducing processor reduces the number of pixels forming the original image so as to generate a low-resolution image. The filtering processor filters data of pixels forming the low-resolution image so as to transform the low-resolution image into a filtered image. The image restoring processor restores the number of pixels forming the filtered image into the number of pixels forming the original image so as to generate a restored image.

Due to this, an image, which has a superior filtering effect, is obtained in the high speed filter process.

The filtering processor filters with a low-pass filter. Due to this, the image which is made by this process, is blurred. Further, in the image, the contours of the object become sufficiently unclear.

Preferably, the image restoring processor restores the number of pixels forming the filtered image to exactly the same number of pixels forming the original image so as to generate the restored image.

Preferably, the reducing processor divides the original image into a plurality of areas which have a plurality of pixels and then chooses one pixel from the pixels in each of the areas. The chosen pixel becomes the pixel in the low-resolution image. Due to this, the low-resolution image is generated.

Further, the reducing processor divides the original image into a plurality of areas which have a plurality of pixels. The reducing processor averages the pixel data from each of the areas. The average pixel data becomes the data for the pixel forming the low-resolution image. Due to this, the low-resolution image is generated.

Preferably, the image restoring processor interpolates the pixel data forming the filtered image so as to generate pixel data forming the restored image.

Preferably, pixels data forming the restored image is further filtered.

The number of pixels forming the low-resolution image can be selected from a stepwise series of the predetermined numbers of pixels.

Further, the image restoring processor can increase the number of pixels forming the filtered image so as to generate a restored image.

According to the present invention, there is provided a filter processing method for filtering original image. The method comprises the steps of decreasing the number of pixels forming the original image so as to generate a low-resolution image, filtering the data of pixels forming the low-resolution image so as to transform the low-resolution image into a filtered image, and restoring the number of pixels forming the filtered image to the number of pixels forming the original image to generate a restored image.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
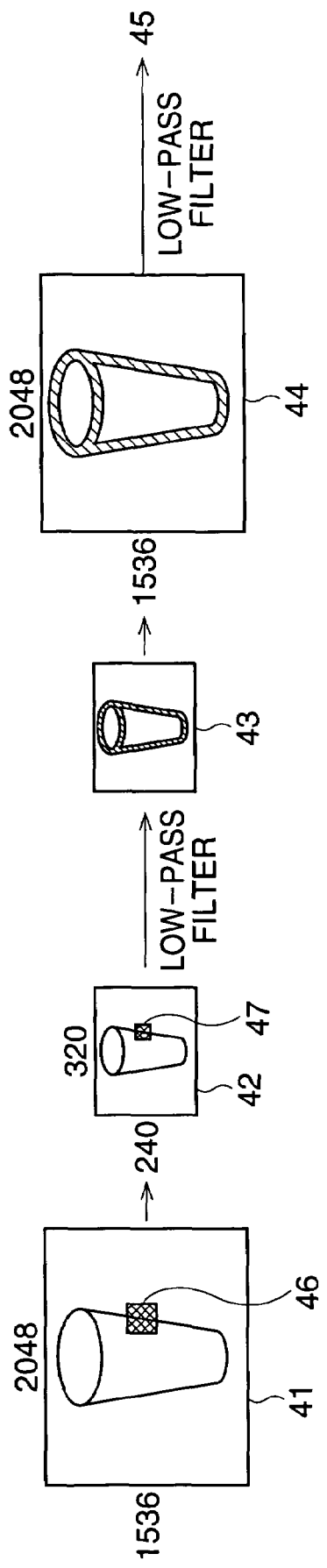
FIG. 1 shows a flowchart of the image-filtering process in a first embodiment according to the present invention.

The present invention will be described below with reference to the embodiments shown in the drawings.

FIG. 1 shows a flowchart of the image-filtering process in a first embodiment according to the present invention. An original image 41 is captured by a digital camera for example. The original image 41 might consist of 2048×1536 pixels for example.

In this embodiment, first, the number of pixels of the original image 41 is decreased. Namely, the image resolution of the original image 41 is reduced, so that the original image 41 is changed to a low-resolution image 42. The low-resolution image 42 consists of 320×240 pixels for example.

Here, a bi-linear interpolation, for example, is carried out for decreasing the number of pixels. In the bi-linear interpolation, the original image 41 is divided into a plurality of areas which have a plurality of pixels. The average pixel data of an area is the pixel data for the respective pixel forming the low-resolution image 42.

Further, an other way described below can be used for decreasing the number of pixels. In this other way, the original image 41 is divided into a plurality of areas which have a plurality of pixels. And then, one pixel is chosen from the plurality of pixels in each of the areas. The chosen pixel is the pixel used for forming the low-resolution image 42.

Furthermore, a bi-cubic convolution can be carried out for decreasing the number of pixels. Namely, when one pixel is chosen from the plurality of pixels in each of the areas, data of this chosen pixel is interpolated by using data of pixels around this chosen pixel.

Pixel data from each pixel of the low-resolution image 42 is filtered by a low-pass filter using a 3×3 matrix at predetermined times. Due to this, the low-resolution image 42 changes to a filtered image 43 consisting of 320×240 pixels.

In the filtered image 43, the contours of the object are not clear, because the image has been filtered by a low-pass filter. Namely, the filtered image 43 is blurred.

Next, the number of the pixels forming the filtered image 43 is restored to the number of pixels forming the original image 41. Namely, the filtered image 43 changes to a restored image 44 consisting of the same number of pixels as the original image 41 (namely 2048×1536 pixels). In the restored image 44, the contours of the object are not clear, similar to those in the filtered image 43.

Further, for example, pixel data of the adjoining pixels forming the filtered image 43 is interpolated to produce pixel data for forming the restored image 44.

A Pixel data for each pixel forming the restored image 44 is filtered by a low-pass filter at predetermined times, so that the noise, which is generated when the image resolution is restored, is deleted. Due to this, a processed image 45 is produced.

The low-pass filter can more effectively make an image blurred after the image resolution is reduced, than if the image resolution is not reduced, if the same matrix (for example 3×3) is used. Therefore, in this embodiment, the original image 41 is filtered with a low-pass filter after the image resolution is reduced. Why it is effective to use a low-pass filter to filter image data of an image whose resolution has been reduced, will be explained in detail next.

One pixel 47 on the low-resolution image 42 corresponds to the area 46 of several pixels on the original image 41 whose resolution is not reduced. Therefore, the 3×3 matrix refers to a larger area if the image resolution has been reduced than if it has not been reduced. Namely, even if the number of pixels referred to in matrix is small (such as the 3×3 matrix=9 pixels), one low-pass filter can make the image blurred as effectively as if there were many pixels referred to in the matrix, for example a 10 by 10 matrix (the number of pixels referred to is a hundred). Of course, the low-pass filter process speed is very high, if the number of pixels referred to in the matrix is small.

As described above, in this embodiment, an image whose resolution is reduced is processed by a low-pass filter, so that the image can become sufficiently blurred though the process speed is very high.

Figure 2:
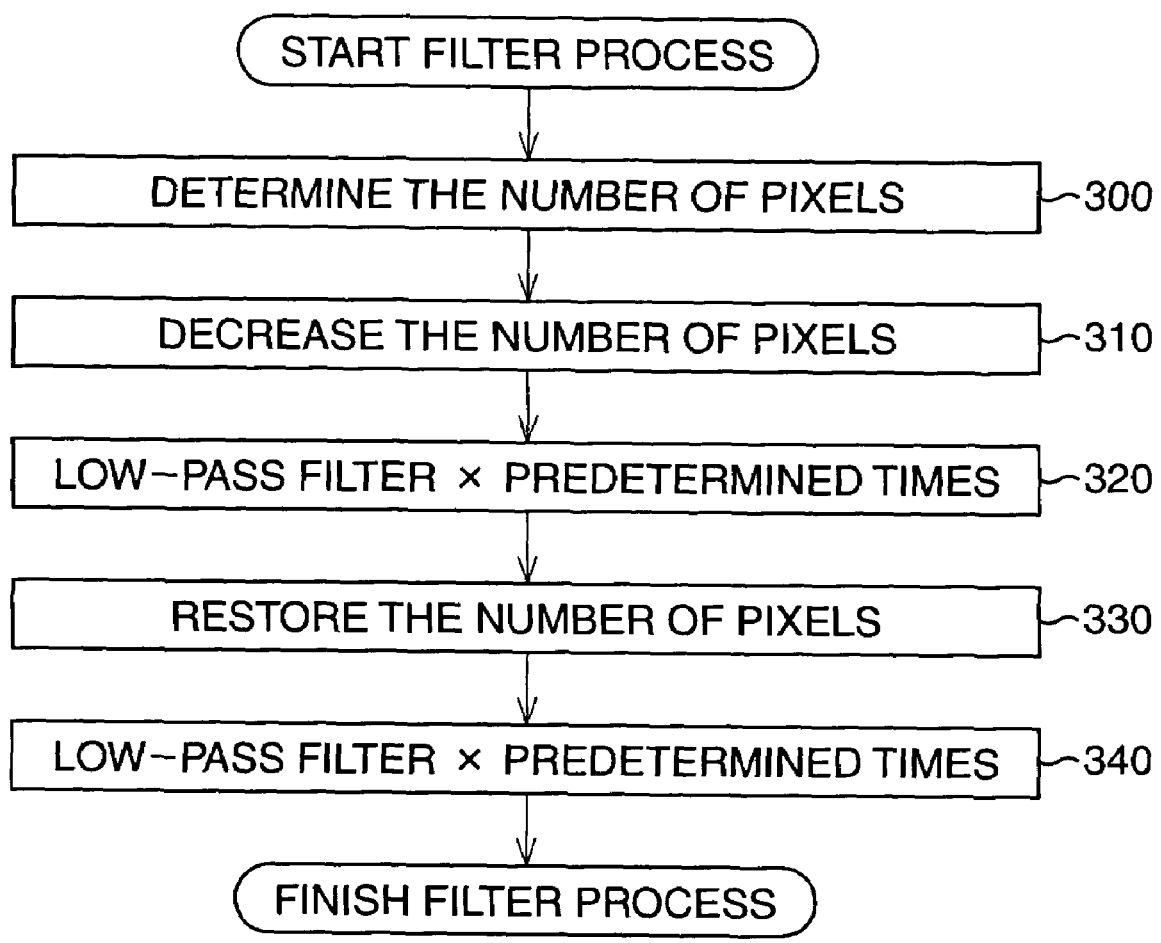
FIG. 2 shows a flowchart of the image-filtering process routine in the first embodiment.

FIG. 2 shows a flowchart of the low-pass filter process routine in the first embodiment. If the low-pass filter process starts, the resolution which is reduced at step 310 is determined at step 300. Namely, at step 300, the image size (the number of the pixels) of the low-resolution image 42 is determined. The image size (the number of the pixels) is selected from a stepwise series of predetermined numbers of pixels. For example, the stepwise series of the predetermined numbers of pixels is 640×480, 480×320, and 320×240.

At step 310, the image resolution of the original image 41 is reduced. Namely, the number of pixels forming the original image 41 is decreased, and then the original image 41 is changed to the low-resolution image 42 whose size is determined at step 300.

At step 320, pixel data of pixels forming the low-resolution image 42 is filtered with a low-pass filter at predetermined times. Due to this, the low-resolution image 42 changes to the filtered image 43.

At step 330, the number of pixels forming the filtered image is restored to the same number of pixels forming the original image 41 (2048×1536) so as to generate the restored image 44. The restored image 44 is slightly blurred, and the contours of the object are sufficiently unclear in the processed image 45.

At step 340, pixel data of each pixel forming the restored image 44 is filtered by a low-pass filter at predetermined times to delete noise. Due to this, the processed image 45 is generated.

As described above, in this embodiment, the image is filtered with low-pass filter after there solution reduction. Therefore, the filtering process can be carried out quickly making the process speed high, while having a remarkable filtering effect on the image, if a small matrix is used.

Further, common filters can be used as the low-pass filters described above. Furthermore, in this embodiment, the low-pass filter is used in the filter process, but filters other than low-pass filters can be used depending on the purpose.

FIGS. 3-9 show a filtering device and filtering process in the second embodiment according to the present invention. In this embodiment, the filtering device and filtering process is used for obtaining the soft focus picture image.

Figure 3:
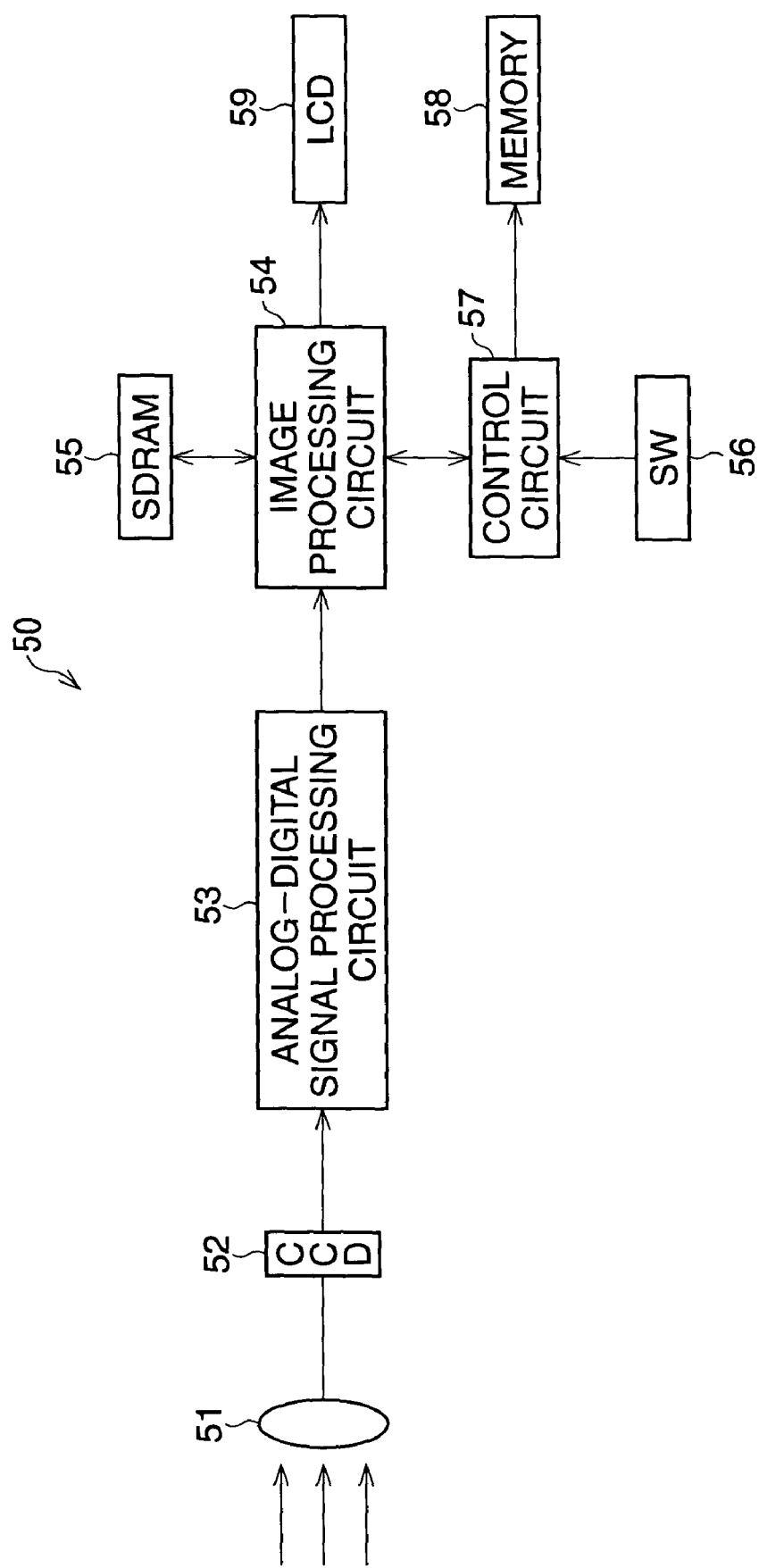
FIG. 3 shows a block diagram of a filtering device in a second embodiment according to the present invention.

FIG. 3 shows a block diagram of a filtering device 50 in a second embodiment according to the present invention. The filtering device 50, which is provided in the digital camera, can make a soft focus picture image.

Light reflected by an object is led through a lens 51 to a CCD 52 having a color filter. At the CCD 52, an electrical charge is generated according to the reflected light. And then an analog signal is generated according to the strength of the electrical charge. The analog signal is sent to an analog-digital signal processing circuit 53. The analog signal is amplified and changed to a digital signal at the analog-digital processing circuit 53. The digital signal is processed according to a predetermined image processing at an image processing circuit 54 to become Bayer data of the original image. The Bayer data is then temporarily stored in a SDRAM 55.

The photograph mode and the detail information are input after a switch 56 is pressed. The detail information concerns the details of the image data process and the conditions when the picture image is taken. At a control circuit 57, control information is calculated according to the photograph mode and the detail information.

If the photograph mode is a soft focus mode, the soft focus level described below as the detail information, is input. The control information, which concerns a YC matrix, an image resolution (an image size), and a gamma curve described below is calculated according to the soft focus level.

The Bayer data stored in the SDRAM 55 is processed according to the control information at the image processing circuit 54. The Bayer data which has been processed is sent to an LCD monitor 59 and the control circuit 57 as processed image data 14 (shown in FIG. 4). The processed image data 14 is encoded in accordance with the JPEG standard at the control circuit 57. The processed image data 14 which is encoded, is memorized in the memory 58 (a Compact Flash Memory (Registered Trademark)).

Figure 4:
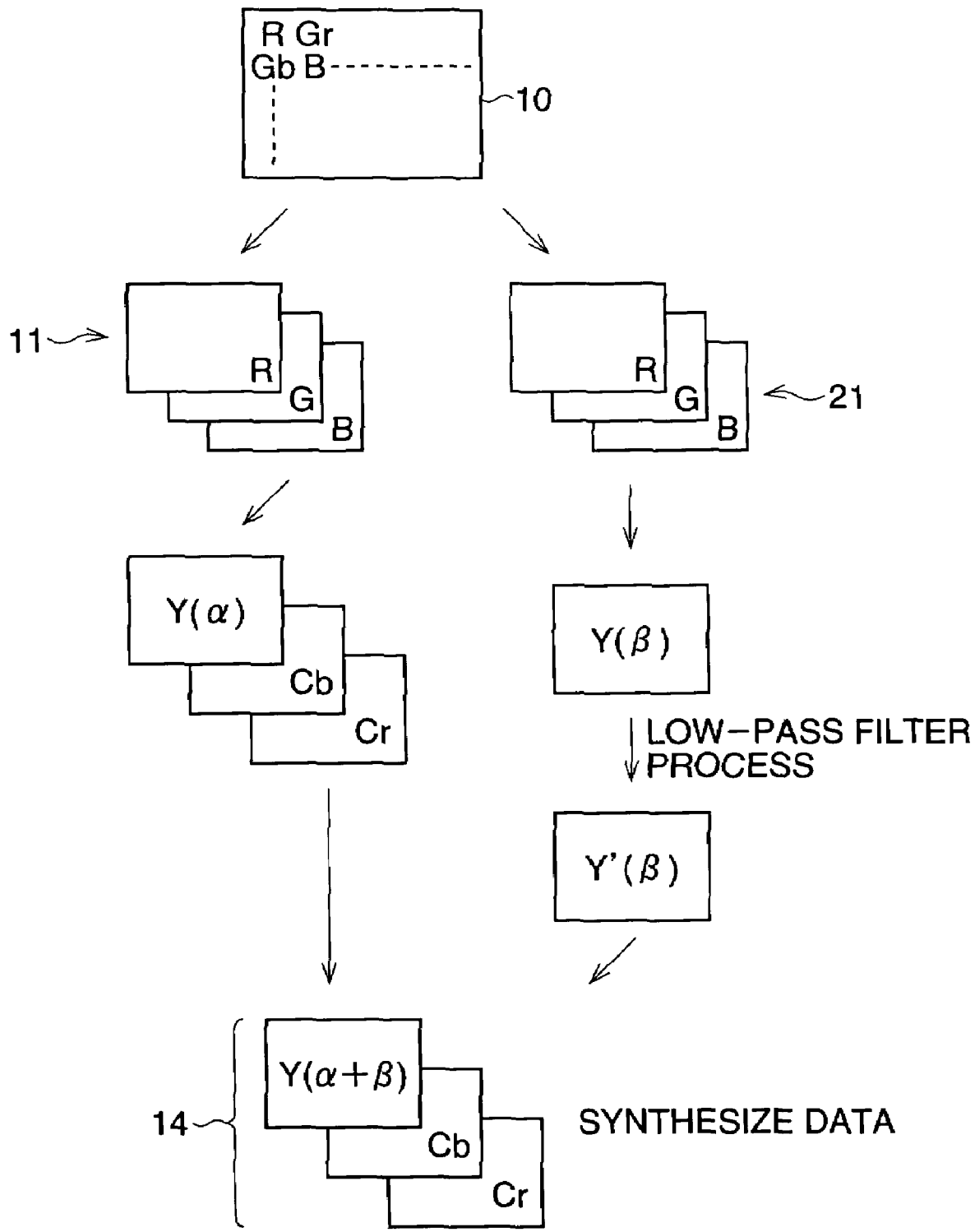
FIG. 4 shows a flowchart of an image process in the second a embodiment.

FIG. 4 shows a flowchart of an image process in the second embodiment. The image process can generate a soft focus picture image. The image process is carried out at the image processing circuit 54 described above. The Bayer data 10 is the image data which is captured by the CCD 52. The adjoining pixels in the Bayer data 10 are interpolated and then a gamma correction is carried out, so as to generate first color data (R, G, and B) 11 and second color data (R, G, and B) 21. A gamma curve which is used in gamma correction for making the first color data 11 is the same as a gamma curve for making the second color data 21 or is different from the gamma curve for making the second color data. If the gamma curves are the same, the first and second color data 11 and 21 are the same.

The first and second color data 11 and 21 are the image data which follow the formality of the RGB 4:4:4 for example. The number of the image pixels for each color R, G, and B regarding the first and second color data 11 and 21 is the same as the number of the image pixels corresponding to the Bayer data 10.

The first color data 11 is changed to a first luminance data Y ($\alpha$) and color difference data Cb and Cr, using a first YC matrix described below. The second color data 21 is changed to a second luminance data Y ($\beta$) and color difference data Cb' and Cr', using a second YC matrix described below. The color difference data Cb' and Cr' are deleted because these are not used.

The first luminance data Y ($\alpha$) and the color difference data Cb and Cr follow the formality of the Y Cb Cr 4:2:2. The number of the image pixels corresponding to the first luminance data Y ($\alpha$) is the same as the number of image pixels corresponding to the Bayer data 10. The number of the image pixels in the color difference data Cb equals half the number of image pixels in the Bayer data 10. Further, the number of image pixels in the color difference data Cr equals half the number of image pixels in the Bayer data 10. The second luminance data Y ($\beta$) and the color difference data Cb' and Cr' are similar to Y ($\alpha$), Cb and Cr.

The second luminance data Y ($\beta$) is filtered using a low pass-filter according to the present invention so that the second luminance data Y ($\beta$) is changed to third luminance data Y' ($\beta$). This low-pass filter is described below. Due to this filtration, the image corresponding to the luminance data becomes slightly blurred, and the contour of the object on the image becomes unclear.

The first luminance data Y ($\alpha$) and the color difference data Cb and Cr are not filtered using a low-pass filter. Therefore, the object image corresponding to the data Y ($\alpha$), Cb, and Cr has clear contours, and the characteristics of the object can be clearly seen in the image.

Next, the third luminance data Y' ($\beta$), the first luminance data Y ($\alpha$), and the color difference data Cb and Cr are synthesized into the processed image data 14.

Namely, the third luminance data Y' ($\beta$) added to first luminance data Y ($\alpha$) makes the luminance data Y ($\alpha+\beta$). Due to this addition, the processed image data 14, which is formed from the luminance data Y ($\alpha+\beta$) and the color difference data Cb and Cr, is obtained.

The luminance data Y ($\alpha+\beta$) consists of the first luminance data Y ($\alpha$) which is not filtered by the low-pass filter and the third luminance data Y' ($\beta$) which is filtered by the low-pass filter. In other words, the image of the processed image data 14 consists of the image which has clear contours, and the image which is slightly blurred and which has unclear contours. Therefore, the image, which is obtained in this embodiment, does not only have clear contours but also is slightly blurred. Namely, the soft focus picture image, which is similar to the soft focus picture taken by the silver-halide film camera, can be obtained easily with a digital camera.

In this case, when the first luminance data Y ($\alpha$) and second luminance data Y ($\beta$) are generated, the original luminance data Y is separated into first luminance data Y ($\alpha$) and second luminance data Y ($\beta$) according to a predetermined ratio. Therefore, the luminance of the soft focus picture image can be substantially same as the luminance of the original image. Due to this, the image of the processed image data 14 can maintain the balance of the original luminance and the original color difference data. Further, the color difference data Cb and Cr do not undergo a low-pass filter process, so that the color balance can be kept. Therefore, a pseudo color is not generated.

As described above, in this embodiment, in the digital camera, the soft focus picture image, having clear contours of the object and not having any pseudo colors, can be obtained in a similar way to that in the silver-halide film camera.

A first YC matrix is shown in formula (1). A second YC matrix is shown in Formula (2). The luminance data and the color difference data of the original image are shown in Formulas (3) to (5).

$$\begin{pmatrix} Y(\alpha) \\ Cb \\ Cr \end{pmatrix} = \begin{pmatrix} 0.297\alpha & 0.586\alpha & 0.113\alpha \\ -0.168 & -0.332 & 0.500 \\ 0.500 & -0.422 & -0.082 \end{pmatrix} \begin{pmatrix} R \\ G \\ B \end{pmatrix} \quad (1)$$

$$\begin{pmatrix} Y(\beta) \\ Cb' \\ Cr' \end{pmatrix} = \begin{pmatrix} 0.297\beta & 0.586\beta & 0.113\beta \\ -0.168 & -0.332 & 0.500 \\ 0.500 & -0.422 & -0.082 \end{pmatrix} \begin{pmatrix} R \\ G \\ B \end{pmatrix} \quad (2)$$

$$Y=0.297R+0.586G+0.113B \quad (3)$$

$$Cb=-0.168R-0.332G+0.500B \quad (4)$$

$$Cr=0.500R-0.422G-0.082B \quad (5)$$

The first color data is changed to the first luminance data Y ($\alpha$) and the color difference data Cb and Cr, using the first YC matrix. The second color data is changed to the second luminance data Y ($\beta$) and the color difference data Cb' and Cr', using the second YC matrix.

A coefficient $\alpha$ added to a coefficient $\beta$ ($\alpha$ and $\beta$ shown in formulas (1) and (2)) equals 1 (namely $\alpha+\beta=1$). Therefore, if the first color data 11 is the same as the second color data 21, the first luminance data Y ($\alpha$) added to the second luminance data Y ($\beta$) makes the luminance data Y of the original data shown in formula (3).

Further, in this embodiment the two color data 11 and 21 are generated, but only one color data need be generated.

In this case, only one color data has to be changed to the luminance data Y and the color difference data Cb and Cr. In this case, the luminance data Y is divided into the first luminance data Y ($\alpha$) and the second luminance data Y ($\beta$), so as to generate the first and second luminance data Y ($\alpha$) and Y ($\beta$)

Figure 5:
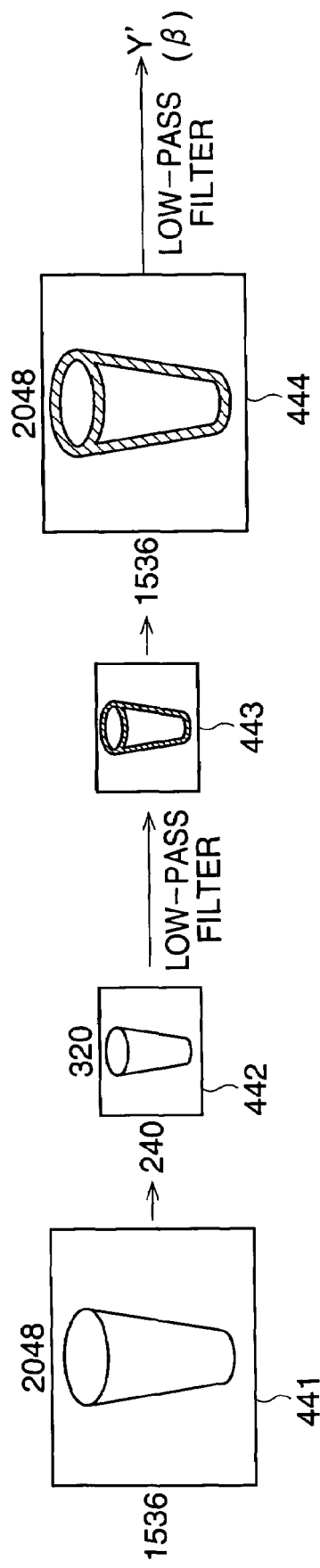
FIG. 5 shows a flowchart of the process for generating third luminance data in the second embodiment.

FIG. 5 shows the process flow including low-pass filter process according to the present invention, for getting the third luminance data Y' (β) from the second luminance data Y (β). A luminance image 441 corresponds to the second luminance data Y (β). In this embodiment, the luminance image 441 consists of 2048×1536 pixels for example. The image resolution of the luminance image 441 is reduced in the same way that it is in the first embodiment, so that the luminance image 441 is changed to the low resolution image 442 consisting of 320×240 pixels for example. The image size (the number of the pixels) of the low resolution image 442 is determined by the detail information input from the switch 56 (shown in FIG. 3).

Each pixel data of the low resolution image 442 is filtered by a low-pass filter using a 3×3 matrix at predetermined times. Due to this, the low resolution image 442 changes to an LPF image 443 consisting of 320×240 pixels. In the LPF image 443, the contours of the object are not clear, because the image has been filtered by a low-pass filter. because the image has been filtered by a low-pass filter.

Next, the image resolution of the LPF image 443 is restored in the same way as it is in the first embodiment. The LPF image 443 changes to a restoration image 444 consisting of the same number of pixels as the luminance image 441 (namely 2048×1536 pixels). Further, the data of the restoration image 444 is filtered by a low-pass filter at predetermined times, so that the noise, which is generated when the image resolution is restored, is deleted. Due to this, third luminance data Y' (β) is obtained. Further, common filters are used as the low-pass filters described above.

The low-pass filter can more effectively make an image blurred after the image resolution is reduced than if the image resolution is not reduced, if the same matrix (for example 3×3) is used. Therefore, in this embodiment, the second luminance data Y (β) is filtered with a low-pass filter, after the image resolution corresponding to the second luminance data is reduced in the same way that the original image 41 is filtered after the number of pixels of the original image 41 is decreased, in the first embodiment.

In this embodiment, the image whose resolution is reduced is processed using the low-pass filter, so that the image can become sufficiently blurred though the process speed is very high.

Figure 6:
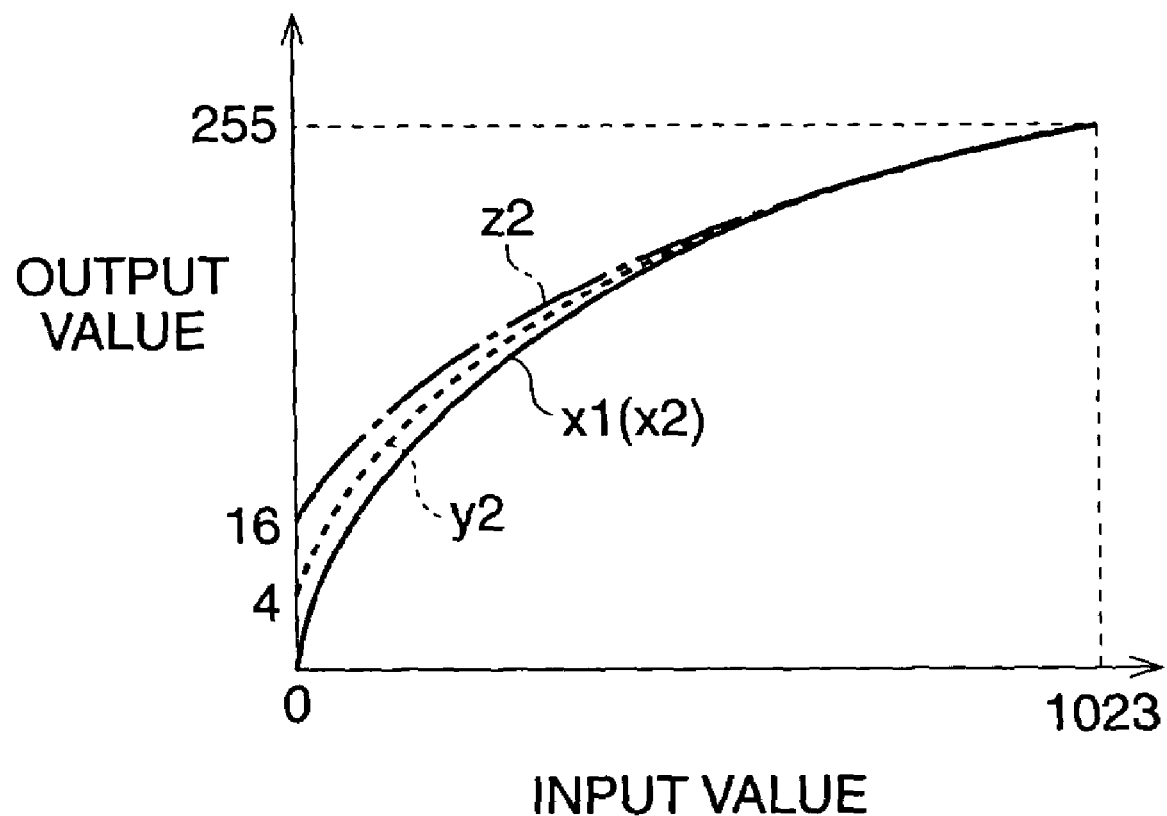
FIG. 6 shows a graph of the first and second gamma curves in the second embodiment.

FIG. 6 shows the graph of the first and second gamma curves. The Bayer data 10 undergoes a gamma correction using the first gamma curve so as to produce the first color data 11. The Bayer data 10 undergoes gamma correction using the second gamma curve so as to produce the second color data 21. In this embodiment, an input amount is 10 bits and an output amount is 8 bits as shown in FIG. 6.

The first gamma curve is always the gamma curve x1. Namely, the contrast of the first color data 11 is always adjusted according to curve x1. Further, the gamma curve x1 is usually used for obtaining the image.

The second gamma curve is selected from stepwise series of predetermined gamma curves x2, y2, or z2. Which curve is selected is instituted by the detail information input from the switch 56 (shown in FIG. 3). Namely, the contrast of the second color data 21 is adjusted according to detail information.

The gamma curve x2 is the same as the first gamma curve x1. The offset of the gamma curve x1 and x2 shown in FIG. 6 is zero. Therefore, if an input value is zero, an output is zero too. On the other hand, the offsets of the gamma curve y2 and z2 are 4 and 16 respectively, therefore, if the input value is zero the output value is 4 or 16 respectively. In the y2 and z2, the larger the input value, the larger the output value, but the rate of increase of the output values is smaller than the rate in the x1 and x2, therefore the curve y2 and z2 overlap the curve x1 when the input values are predetermined values.

When the second color data 21 is generated using the gamma curve y2 as the second gamma curve, even if the input value of the pixel is very small, the output value of the pixel is comparatively large as shown in FIG. 6. Therefore, a flare appears all over the image corresponding to the second color data 21, because all of the pixels have a color data output value which is comparatively large. Due to this, the flares appear on the images corresponding to the second luminance data Y (β) and the third luminance data Y' (β), namely, the flare appears also on the soft focus picture image which is obtained by the image process in this embodiment, and the soft focus picture image always produces a flare effect. If the gamma curve z2 is used, the soft focus picture image always has a flare effect as well, further, this flare effect is greater than when using curve y2, because the offset value of the curve z2 is larger than the offset value of the curve y2.

Described above, in this embodiment, the first color data (the first luminance data Y (α)) and the second color data (second luminance data Y (β)) are generated independently using the first and second gamma curve respectively, and the second gamma curve can be selected from a stepwise series of predetermined gamma curves. Therefore, the flare can appear on the soft focus picture image according to the desire of the user.

Figure 7:
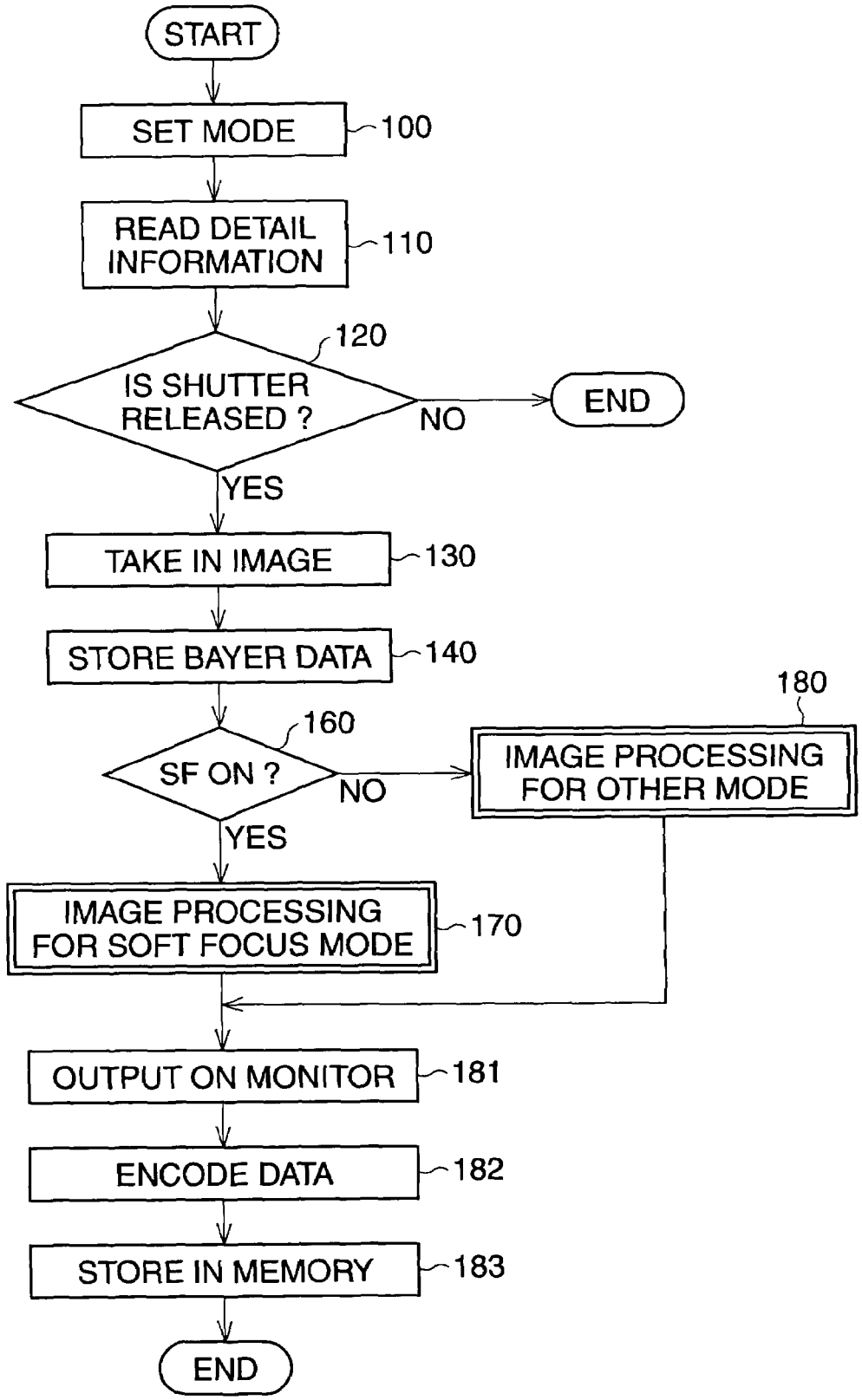
FIG. 7 shows a flowchart of the image processing routine in the second embodiment.
Figure 8:
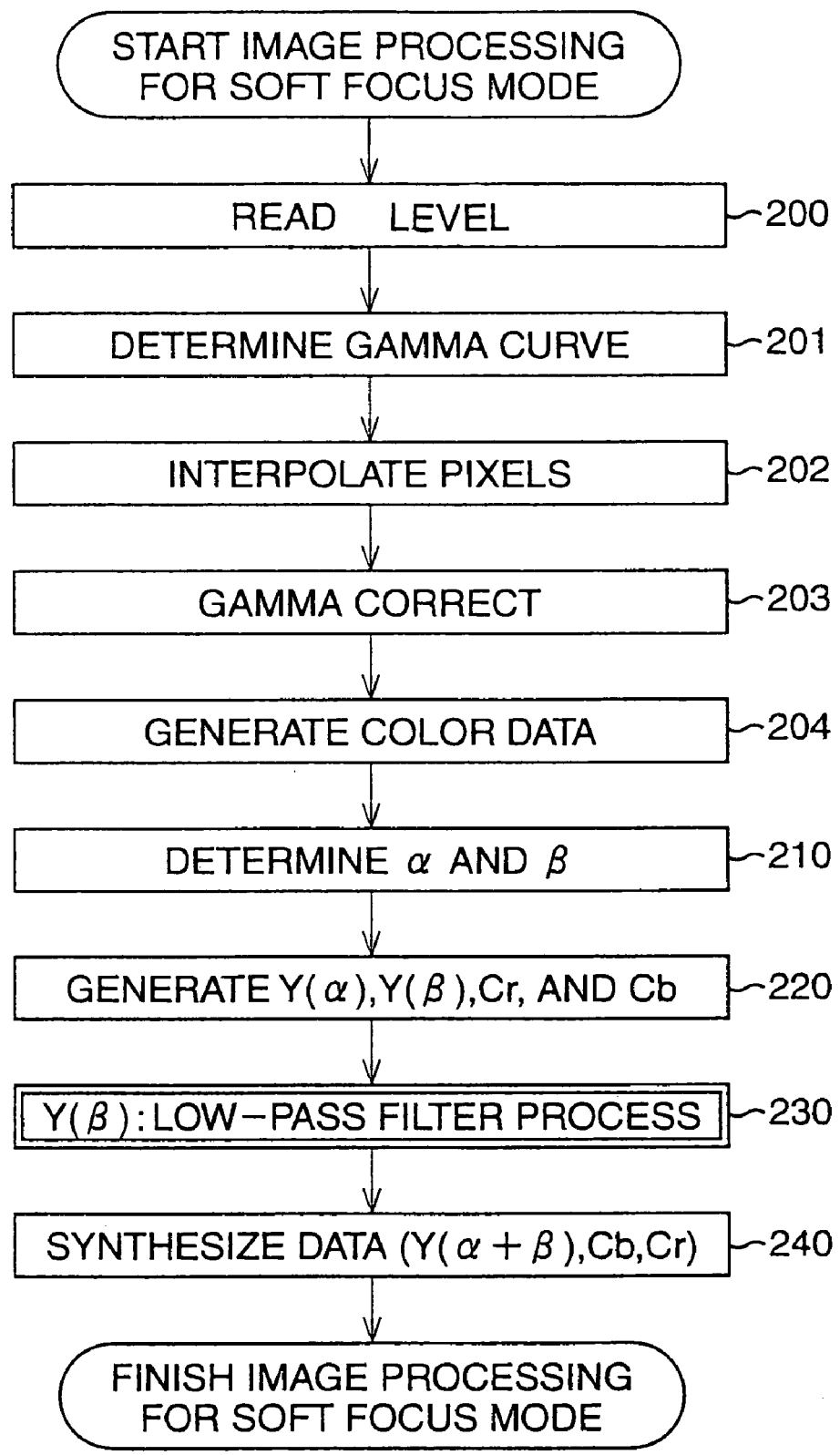
FIG. 8 shows a flowchart of the image processing routine in the soft focus mode in the second embodiment.
Figure 9:
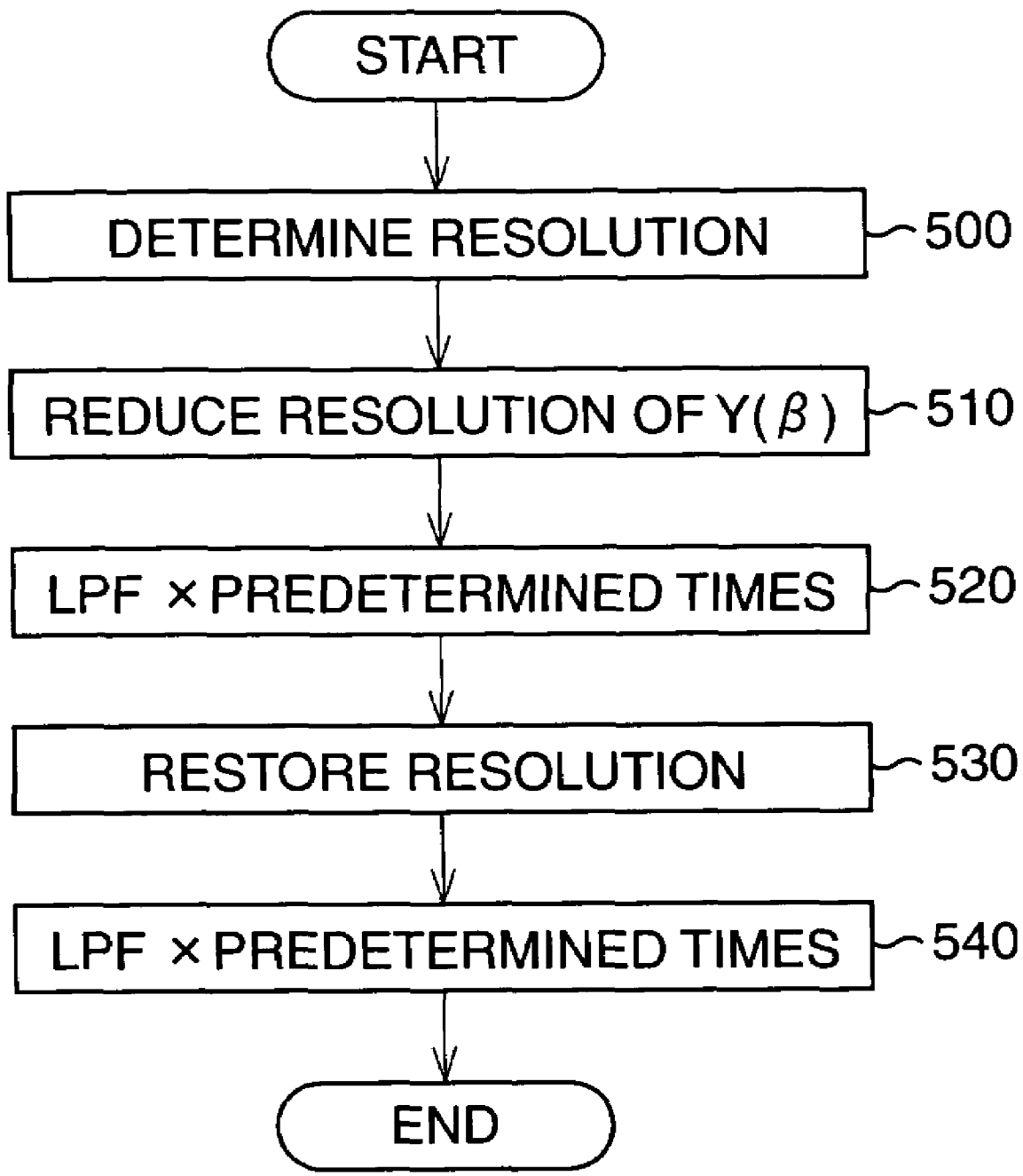
FIG. 9 shows a flowchart of the low-pass filter process routine in the second embodiment.

FIGS. 7, 8, and 9 show the flow chart of the image processing routine in the filtering device 50. In this routine, as shown in FIG. 7, at step 100, the photograph mode is selected from the ordinary photograph mode, the macro mode, or the soft-focus mode etc. according to the input from the switch 56 (shown in FIG. 3). Namely, at step 100, the photograph mode is set.

At step 110, the detail information which is input from the switch 56 is read. If the photograph mode is the soft-focus mode, the soft focus level as the detail information is input from the switch 56. The soft focus level is selected from 5 step levels (from 0 to 4). The detail setting is determined according to the soft focus level at step 201, 210, and 500 described below. As shown in Table 1, the coefficients α and β, the image size after reducing the image resolution, and the second gamma curve are determined as the detail settings. Note, the gamma curve x2, y2, and z2 shown in FIG. 6 correspond to x2, y2, and z2 in Table 1 respectively.

TABLE 1

| Soft focus Level | A | β | Image Size | Y curve |
| --- | --- | --- | --- | --- |
| 0 | 0.8 | 0.2 | 640 × 480 | x2 |
| 1 | 0.6 | 0.4 | 480 × 320 | x2 |
| 2 | 0.4 | 0.6 | 320 × 240 | x2 |
| 3 | 0.3 | 0.7 | 320 × 240 | y2 |
| 4 | 0.15 | 0.85 | 320 × 240 | z2 |

At step 120, whether a shutter button is pushed, namely, whether a shutter is released is determined. If the shutter is not released, the image processing routine finishes. If the shutter is released, the image is taken in by the CCD 52 at step 130, the image data is processed in the analog-digital signal processing circuit 53, and then the image data is stored in the SDRAM 55 as the Bayer data 10 at step 140. At step 160, whether the photograph mode which is input at step 100 is the soft focus mode is determined. If the mode is the soft focus mode, the Bayer data 10 is given the image processing for the soft focus mode at step 170 (shown in FIG.). Unless the mode is soft focus mode, the Bayer data 10 is given the image processing for the other than soft focus mode at step 180. The processed image data 14 which is processed at step 170 or 180 is output on the LCD monitor 59 at step 181. At step 182, the processed image data 14 is encoded in accordance with JPEG standard. Next, at step 183, the encoded processed image data 14 is stored on the memory 58, and then, the image processing routine in this embodiment finishes. at step 181. At step 182, the processed image data 14 is encoded in accordance with JPEG standard. Next, at step 183, the encoded processed image data 14 is stored on the memory 58, and then, the image processing routine in this embodiment finishes.

FIG. 8 shows a flowchart of the image processing routine in the soft focus mode at step 170. If the image processing starts for the soft focus mode, the soft focus level, which is determined at step 110, is read at step 200. At step 201, the second gamma curve is determined according to the soft focus level as shew shown in Table 1.

At step 202, the adjoining pixels of the Bayer data 10 (shown in FIG. 4) are interpolated by a common method.

At step 203, the interpolated data is gamma corrected using the first gamma curve x1 so as to produce the first color data 11 at step 204. Similarly, at step 203 the interpolated data is gamma corrected using the second gamma curve determined at step 201 so as to produce the second color data 21 at step 204. Namely, at step 204, two color data 11 and 21 are generated.

At step 210, the coefficients $\alpha$ and $\beta$ are determined according to the soft focus level as show in Table 1. The luminance data of the original image is separated into the first luminance data Y ($\alpha$) and the second luminance data Y ($\beta$) according to the ratio of $\alpha$ and $\beta$ as described above.

At step 220, not only are the color difference data Cb and Cr generated, but also the first luminance data Y ($\alpha$) and the second luminance data Y ($\beta$) are generated.

At step 230, the second luminance data Y ($\beta$) is given the low-pass filter process shown in FIG. 9, so that the third data Y' ($\beta$) is generated. After the low-pass filter process, at step 240, the first luminance data Y ($\alpha$) added the third luminance data Y' ($\beta$) makes the luminance data Y ($\alpha+\beta$) Due to this, at step 240, the processed image data 14 having the color difference data Cb and Cr and the luminance data Y ($\alpha+\beta$), is generated. If Step 240 has finished, the image processing for the soft focus mode finishes.

FIG. 9 shows the flowchart of the low-pass filter process routine at step 230. If the low-pass filter process starts, the image resolution which is reduced at step 510 is determined at step 500. Namely, at step 500, the image size (the number of the pixels) of the low resolution image 442 (shown in FIG. 5) is determined according to the soft focus level as shown in Table 1. At step 510, the image resolution of the luminance image 441 (shown in FIG. 5) corresponding to the second luminance data Y ($\beta$), is reduced, and then the luminance image 441 is changed to the low resolution image 442 whose size is determined at step 500.

At step 520, the second luminance data Y ($\beta$), to which the low resolution image 442 corresponds, is filtered with a low-pass filter at predetermined times. Due to this, the low resolution image 442 changes to the LPF image 443 (shown in FIG. 5).

At step 530, the image resolution of the LPF image 443 is restored to the image resolution of the original image. Due to this, the LPF image 443 changes to a restoration image 444 (shown in FIG. 5). At step 540, the luminance data corresponding to the restoration image 444 is filtered with low-pass filters at predetermined times. Due to this, third luminance data Y' ($\beta$) is generated and the low-pass filter process routine finishes.

As shown in the flowchart of the image processing routine, in this embodiment, the predetermined ratio (namely,$\alpha$and $\beta$) for separating the original luminance data Y into the first luminance data Y ($\alpha$) and the second luminance data Y ($\beta$), the image resolution in low-pass filter process, and the second gamma curve which is used when the second luminance data Y ($\beta$) is generated, can be selected from a stepwise series. Due to this, the blurred extent of the soft focus picture image can be set stepwise and easily. Namely, in this embodiment, the soft focus picture image can be provided according to the characteristics of the object or the desire of the user.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2002-266990 (filed on Sep. 12, 2002) and No. 2002-266979 (filed on Sep. 12, 2002) which are expressly incorporated herein, by reference, in its entirety.

The invention claimed is:

1. A filtering device which filters an original image, the filtering device comprising:
    a reducing processor that reduces a number of pixels forming the original image so as to generate a low-resolution image, said reducing processor divides said original image into a plurality of areas which have a plurality of pixels and then chooses one pixel from said plurality of pixels of each of said areas, the chosen pixel being the pixel used to form said low-resolution image, so as to generate said low-resolution image;
    a filtering processor that filters pixel data of pixels forming the low-resolution image so as to transform the low-resolution image into a filtered image; and
    an image restoring processor that increases the number of pixels forming the filtered image so as to generate a restored image.

2. A filtering process for filtering an original image, the process comprising:
    decreasing the number of pixels forming the original image so as to generate a low-resolution image, the decreasing comprising dividing the original image into a plurality of areas which have a plurality of pixels and then choosing one pixel from the plurality of pixels of each of the areas, the chosen pixel being the pixel used to form the low-resolution image, so as to generate the low-resolution image;
    filtering pixel data of pixels forming the low-resolution image so as to transform the low-resolution image into a filtered image; and
    restoring the number of pixels forming the filtered image to the number of pixels forming the original image to generate a restored image.

3. A filtering device which filters an original image, the filtering device comprising:
    a reducing processor that reduces the number of pixels forming said original image so as to generate a low-resolution image, said reducing processor dividing said original image into a plurality of areas which have a plurality of pixels, the average pixel data of each of said areas being data of each pixel forming said low-resolution image, so as to generate said low-resolution image;

a filtering processor that filters pixel data of pixels forming said low-resolution image so as to transform said low-resolution image into a filtered image; and an image restoring processor that increases the number of pixels forming said filtered image so as to generate a restored image.

4. The filtering device according to claim 3, wherein said filtering processor filters with a low-pass filter.

5. The filtering device according to claim 3, wherein said image restoring processor restores the number of pixels forming said filtered image to exactly the same number of pixels forming said original image.

6. The filtering device according to claim 3, wherein said image restoring processor interpolates pixel data forming said filtered image so as to generate pixel data forming said restored image.

7. The filtering device according to claim 3, wherein pixel data forming said restored image is further filtered.

8. The filtering device according to claim 3, wherein the number of pixels forming said low-resolution image can be selected from a stepwise series of predetermined numbers of pixels.

9. A filtering process for filtering an original image, the process comprising:

decreasing the number of pixels forming the original image so as to generate a low-resolution image, the decreasing comprising dividing the original image into a plurality of areas which have a plurality of pixels, the average pixel data of each of the areas being data of each pixel forming the low-resolution image, so as to generate the low-resolution image;

filtering pixel data of pixels forming the low-resolution image so as to transform the low-resolution image into a filtered image; and restoring the number of pixels forming the filtered image to the number of pixels forming the original image to generate a restored image.

10. The filtering process according to claim 9, wherein the filtering comprises filtering with a low-pass filter.

11. The filtering process according to claim 9, wherein the restoring restores the number of pixels forming the filtered image to exactly the same number of pixels forming the original image.

12. The filtering process according to claim 9, wherein the restoring comprises interpolating pixel data forming the filtered image so as to generate pixel data forming the restored image.

13. The filtering process according to claim 9, further comprising pixel data forming further filtering the restored image.

14. The filtering process according to claim 9, wherein the number of pixels forming the low-resolution image can be selected from a stepwise series of predetermined numbers of pixels.

* * * * *